F. DIEHL.
GEARING.
APPLICATION FILED FEB. 26, 1906.

944,323.

Patented Dec. 28, 1909.

Witnesses
Geo. W. Young
N. E. Oliphant

Inventor
Frank Diehl
H. G. Underwood
Attorney
By

UNITED STATES PATENT OFFICE.

FRANK DIEHL, OF SHEBOYGAN FALLS, WISCONSIN, ASSIGNOR TO GEORGE P. MYERS, OF SHEBOYGAN, WISCONSIN.

GEARING.

944,323.  Specification of Letters Patent. Patented Dec. 28, 1909.

Application filed February 26, 1906. Serial No. 302,990.

*To all whom it may concern:*

Be it known that I, FRANK DIEHL, a citizen of the United States, and resident of Sheboygan Falls, in the county of Sheboygan and State of Wisconsin, have invented certain new and useful Improvements in Gearing for Woodworking-Machines; and I do hereby declare that the following is a full, clear, and exact description thereof.

My invention has for its object to improve the driving mechanism of word-working machines such as are set forth in Patent No. 816,079, granted March 27, 1906, and it consists in certain peculiarities of construction and combination of parts hereinafter particularly set forth with reference to the accompanying drawings and subsequently claimed.

Figure 1:
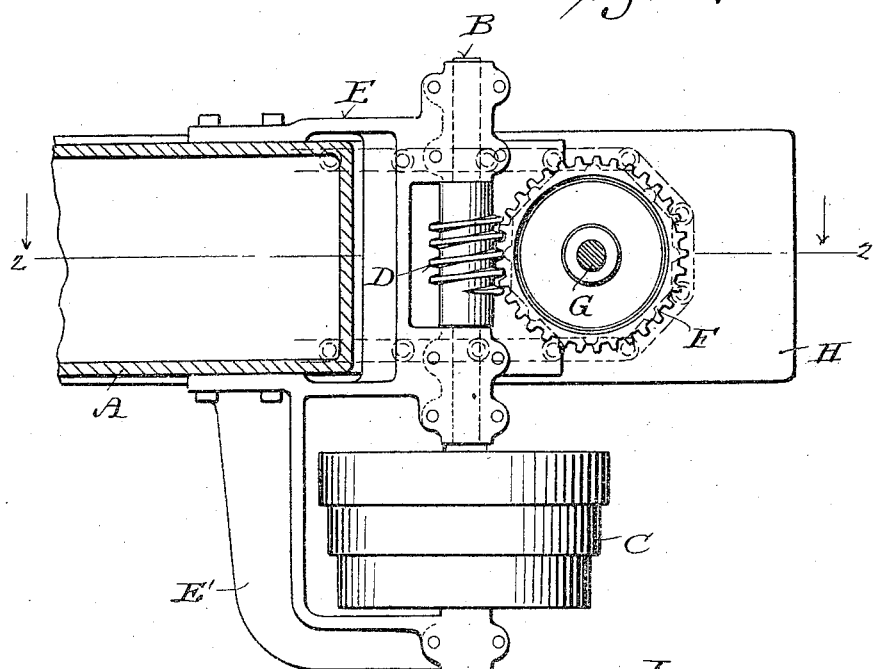
Figure 2:
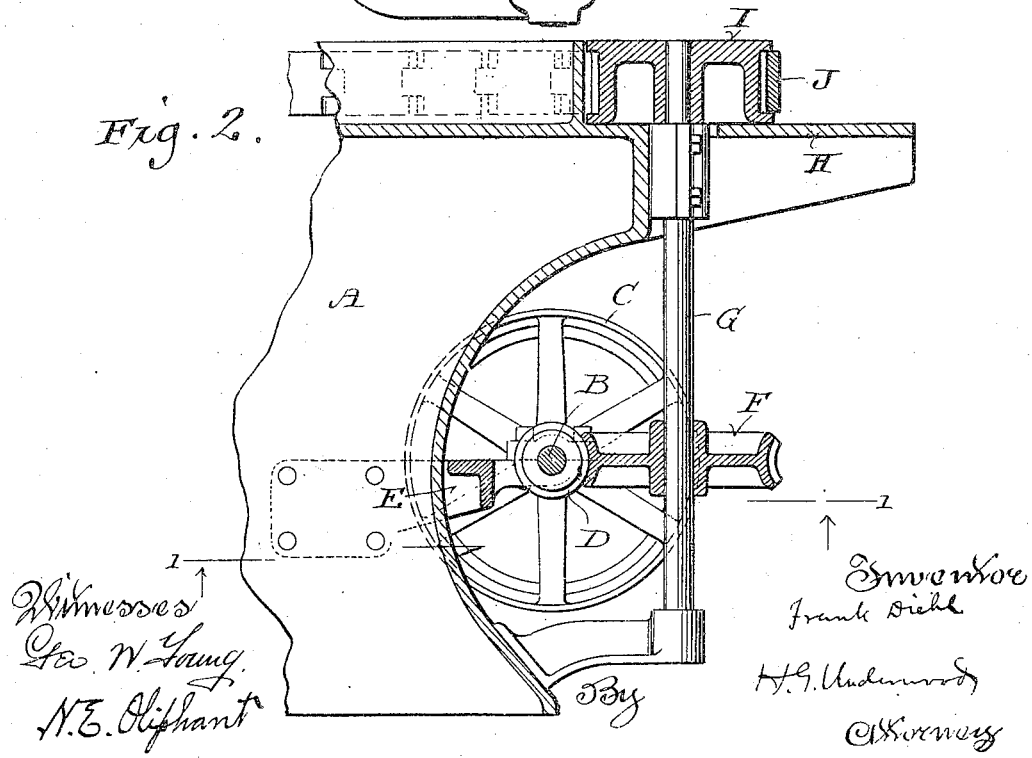

Figure 1 of the drawings represents a horizontal sectional view of a fragment of a wood-working machine similar to those aforesaid and provided with the improved drive-mechanism hereinafter specified, the view being indicated by lines 1—1 in the next figure, and Fig. 2, a vertical longitudinal section view on the plane indicated by line 2—2 in Fig. 1.

Referring by letter to the drawings, A indicates the frame of the machine provided with bearings for a horizontal main shaft B having a belt-pulley C and a worm D fast thereon, the pulley being preferably of the cone variety, as is herein shown. All the bearings for the main-shaft are on a single angular bracket E attached to sides of the machine-frame, and the belt-pulley on said shaft is within the confines of a right-angle arm E' of said bracket projecting from one side of said frame.

The worm D meshes with a worm-wheel F fast on a vertical shaft G for which the machine-frame is provided with suitable bearings, and fast on the vertical shaft, above a bed-plate extension H of said frame, is the drive-pulley I for the feed-chain J of the machine.

Motion from the main-shaft B is conveyed to the shaft G, by the worm-gear D, F, to drive the pulley I with which the feed-chain J is engaged, the drive-mechanism, as a whole, being very simple, economical and easy of access, while at the same time a simple provision is had for a variable speed drive of said pulley.

Having thus described my invention, what I claim as new, and desire to secure by Letters-Patent, is:

In a machine of the species set forth, the combination of the frame provided with vertical bearings and a bed-plate extension, a single bracket attached to the sides of the machine-frame below the bed-plate extension and having an offset right-angle arm, said arm and the bracket being provided with horizontal bearings, gear-connected vertical and horizontal shafts in the bearings aforesaid, a main driving pulley on the horizontal shaft between the bracket and said arm of same, and a feed-chain drive-pulley on the vertical shaft over said bed-plate extension.

In testimony that I claim the foregoing I have hereunto set my hand at Chicago in the county of Cook and State of Illinois in the presence of two witnesses.

FRANK DIEHL.

Witnesses:
G. M. DIEHL,
CHARLES E. YOUNG.